United States Patent [19]

Sugihara et al.

[11] Patent Number: 4,993,866
[45] Date of Patent: Feb. 19, 1991

[54] CONNECTION FITTING FOR A PICTURE FRAME CORNER

[76] Inventors: Yoshichika Sugihara, 4-12-15, Aoi, Adachiku, Tokyo; Yasunoiri Suzuki, 1205-16, Kaburagi-cho, Sakura-shi, Chiba-ken, both of Japan

[21] Appl. No.: 430,813

[22] Filed: Nov. 2, 1989

[51] Int. Cl.⁵ .............................................. F16B 12/44
[52] U.S. Cl. .................................... 403/402; 403/295; 403/382; 403/403; 40/155; 40/156
[58] Field of Search ............... 403/401, 402, 403, 294, 403/295, 205, 382, 293; 40/155, 152, 156

[56] References Cited

U.S. PATENT DOCUMENTS

| | | | |
|---|---|---|---|
| 4,076,438 | 2/1978 | Bos | 403/402 |
| 4,145,828 | 3/1979 | Hillstrom | 40/156 |
| 4,237,632 | 12/1980 | Segerstad | 40/156 |
| 4,530,195 | 7/1985 | Leopold | 403/401 X |
| 4,802,294 | 2/1989 | Baus | 40/155 |
| 4,825,529 | 5/1989 | Sawada et al. | 403/402 X |
| 4,862,612 | 9/1989 | Sugihara | 40/155 |

*Primary Examiner*—Peter M. Cuomo
*Attorney, Agent, or Firm*—Merchant, Gould, Smith, Edell, Welter & Schmidt

[57] ABSTRACT

A corner connection fitting (1) for a frame is disclosed. The corner connection fitting (1) interconnects front frame members (18) to base frame members (13). The front frame members (18) are rotatable to an outer, open position so as to allow the picture (21) to be easily inserted or adjusted within the frame assembly.

6 Claims, 3 Drawing Sheets

CONNECTION FITTING FOR A PICTURE FRAME CORNER

FIELD OF THE INVENTION

The present invention relates to a corner connection fitting utilized to assemble the corner of a frame, and more particularly to a fitting for picture frames which allows easy assembly of the frame and easy replacement of pictures.

BACKGROUND OF THE INVENTION

The conventional method for assembling a corner part of a frame has been to fix an L-shaped corner connection fitting to the ends of the adjacent frame members with rivets and/or set screws. However, this conventional method requires many parts and significant labor. This type of assembly is complicated and entails relatively high production cost. Further, it is necessary that the fixture be removed each time the picture is to be changed. Moreover, the picture-replacing process must be performed from the back side of the frame, making the proper alignment and location of the picture very troublesome, and requiring significant time for reassembly.

The present invention addresses these and other problems with conventional techniques for assembling a frame.

SUMMARY OF THE INVENTION

The present invention comprises a corner connection fitting for frames which does not require the use of rivets or set screws in order to assemble the corner parts of the frame. Rather, the present invention enables easy assembly simply by inserting components of the corner connection fitting. Moreover, it is not necessary with the present invention that the frame be completely disassembled when a picture is replaced. Indeed, it is not even necessary to take the frame from the wall on which it is hanging. The present invention enables the easy replacement of a picture from the front face of the frame while the user is looking at the picture. In addition, the present invention does not require any additional parts, thereby allowing the manufacture of the frame to be relatively inexpensive and labor-saving.

DETAILED DESCRIPTION OF THE PREFERRED EMBODIMENT

Figure 1:
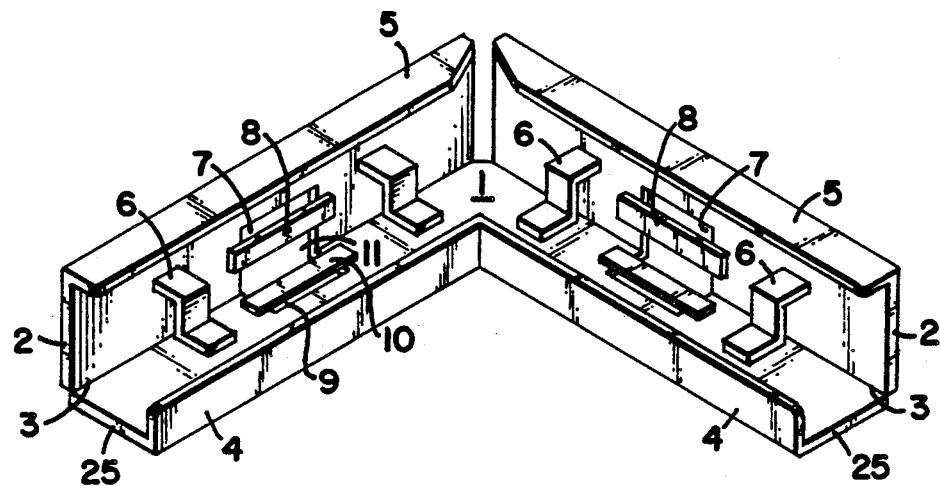
FIG. 1 is a perspective view of a preferred, exemplary embodiment of the corner connection fitting of the present invention.

An exemplary embodiment of the invention is explained with respect to the Drawing, wherein like reference numerals represent like parts.

A corner connection fitting 1 for a frame is illustrated in FIG. 1. The corner connection fitting 1 is made of a synthetic resin with a substantially L-shaped contour. The fitting 1 is symmetrical on the right and left sides as viewed with respect to the chain line of FIG. 1. Therefore, the description herein will be limited to the left side of FIG. 1. The corner connection fitting 1 has a bottom part 25 which is formed preferably in an L-shape, with a lip portion or base guide 4. At the outside of the bottom part 25 is a corner side part 2, with the bottom part 25 and side part 2 being interconnected by a corner hinge 3. The corner hinge or hinge means 3 enables the bottom part 25 and side part 2 to be free to bend approximately 45° to the inside and outside. At the inside of the frame corner 1 is a base guide 4. A frame guide 5 is formed at the upper end of the corner side part 2.

As illustrated in FIG. 1, there is a corner hook 6 which is preferably formed as a single, unitary body with the side part 2. The corner hook 6 has two substantially parallel upper and lower surfaces, interconnected by a central portion which is substantially perpendicular to the two parallel surfaces. At the free end of the corner hook 6 is a dented portion 29. Next to the corner hook 6 is a corner upper hole 7 formed in the side part 2 and a corner lower hole 9 formed in the bottom part 25. Also illustrated are a plate spring upper attaching plate 8, and a plate spring lower attaching plate 10. A corner center hole 11 is formed between the upper attaching plate 8 and lower attaching plate 10. Although one corner hook 6 could serve the function, two corner hooks 6 are illustrated in the preferred embodiment herein to increase the strength of the corner connection fitting 1. As noted above, the right half of the corner connection fitting 1 has the same structure as the left half.

Figure 2:
FIG. 2 is a perspective view of the plate spring.

FIG. 2 is a perspective view of the plate spring 12. The plate spring 12 is preferably made of a synthetic resin and is intended to be attached between the plate spring upper attaching plate 8 and the plate spring lower attaching plate 10. To form the plate spring 12, a band-like plate is bent at a sharp angle proximate its center portion. The plate is further bent at both ends toward the inside in order to achieve a hook shape as illustrated in FIG. 2. The plate spring 12 serves as biasing means by applying a force which acts to move the side port 2 and bottom port 25 toward each other.

Figure 5:
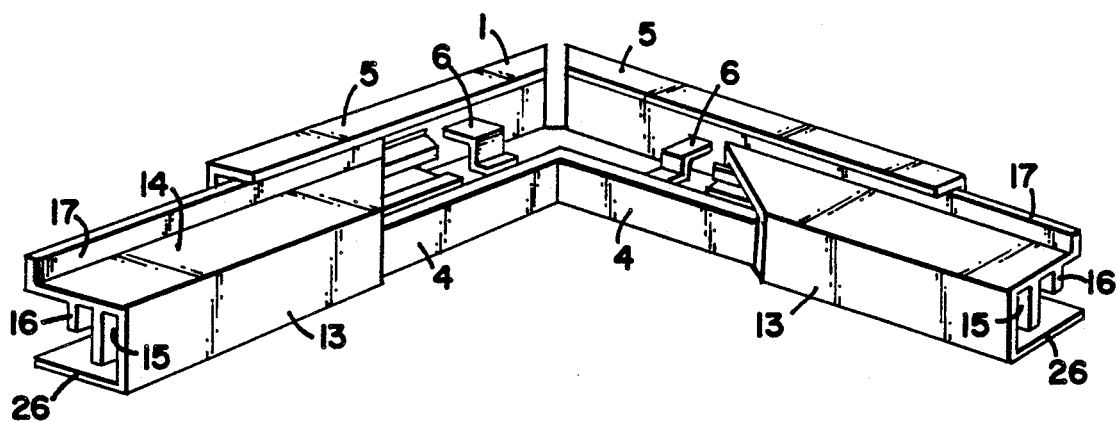
FIG. 5 is a perspective view of the frame corner connection fitting inserted into the base frame member.

As shown in FIG. 5, there is illustrated a base frame member 13 which has a substantially U-shape, including a base upper part 14, a base lower part 26, and a base central part 27. Preferably, the base frame member 13 is made of a synthetic resin. The base frame member 13 has a base guide groove 15 and a base stopper 16, which are located at the underside of the base upper part 14, toward its inner side. A base picture face partition 17 is located on the upper side of the base upper part 14, toward its outer side. Both ends of the base frame members 13 are formed at a 45° angle.

Figure 6:
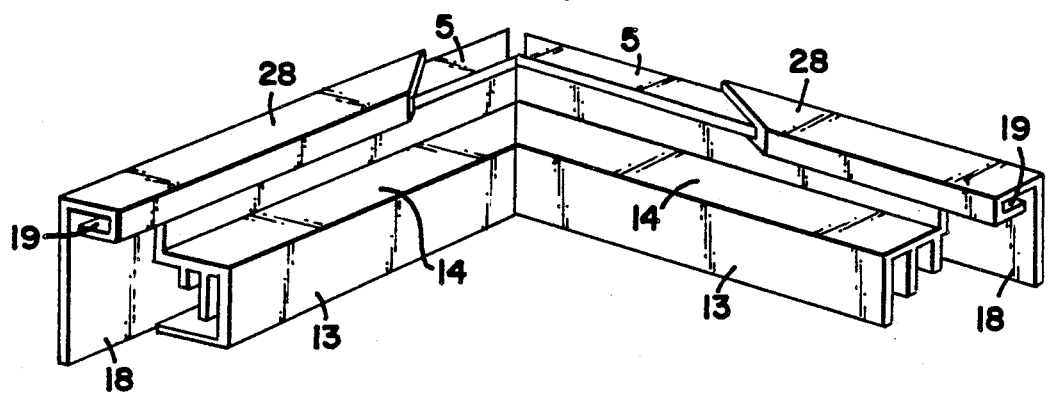
FIG. 6 is a perspective view of the frame corner connection fitting inserted into the front frame member.

A front frame member 18 is illustrated in FIG. 6. Preferably the front frame member 18 is made of a metal material. The upper part of the front frame member 18 is formed with a U-shaped flange 28, in which a frame guide groove 19 is present. Each end of the front frame member 18 is formed at a 45° angle.

Figure 3:
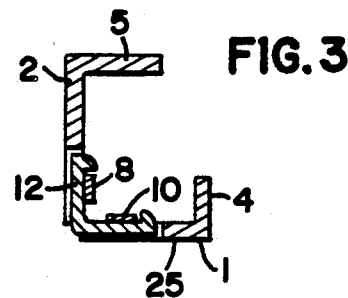
FIG. 3 is a sectional view of the plate spring as attached to the frame corner connection fitting.
Figure 4:
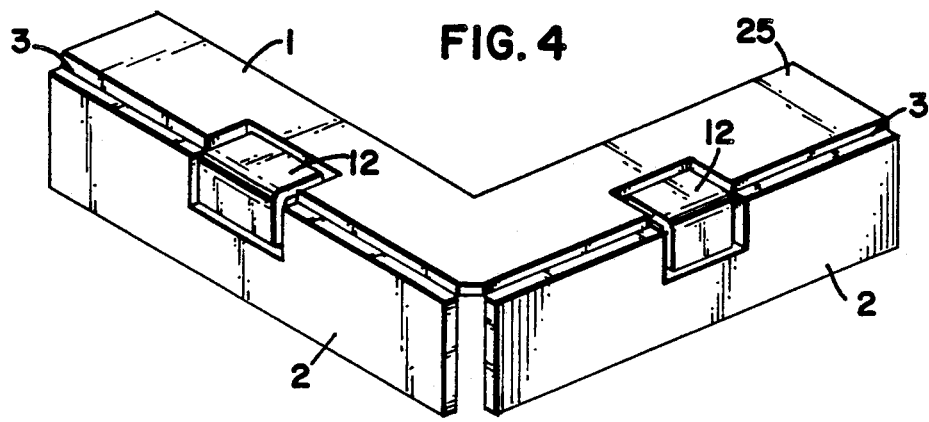
FIG. 4 is a perspective view of the plate spring attached to the corner connection fitting of a frame as viewed from the back side.

According to the above-described structure, the ends of the plate spring 12 are inserted into the upper hole 7 and lower hole 9 of the corner connection fitting 1. When the plate spring 12 is inserted, the corner side part 2 is pushed toward the inner side of the corner connection fastener 1, as illustrated by the arrows in FIGS. 3 and 4. The plate spring 12 is inserted so as to be completely fixed to the upper attaching plate 8 and the lower attaching plate 10. In this position, the shape of the plate spring 12 forms a rather sharp angle of about 30° when viewed from the side. Moreover, the plate spring 12 tightly adheres to the insides of the upper attaching plate 8 and the lower attaching plate 10 respectively as seen in FIG. 3, so that the attaching plates 8, 10 are present without being seen from the outside. FIG. 4 is a back side view of the plate springs 12 as attached to the frame corner fastener 1. The corner side part 2 is acted upon by the force of the plate spring 12 to keep it biased toward the direction of inside the corner connection fitting 1.

FIG. 5 shows the position of the base guide 4 of the corner connection fitting 1 as it is slidably inserted into the base guide groove 15 of the base frame member 13. Because both ends of the base frame member 13 are cut at a 45° angle, the adjacent base frame members 13 abut against each other and are coupled at the center position of the corner connection fitting. FIG. 6 indicates the position of the frame guide groove 19 at the upper part of the frame member 18 as it accommodates the insertion of the frame guide 5 at the upper part of the frame corner connection fitting 1. The frame guide groove 19 is moved in the direction of the arrow (FIG. 6), and both of the left and right frame members 18 are thus affixed and abut against each other at the center position of the corner.

Figure 7:
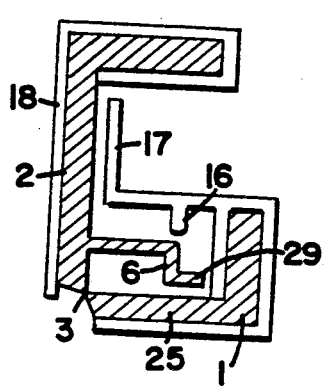
FIG. 7 is a sectional view of the frame corner connection fitting assembled with respect to the base frame member and the front frame member.
Figure 8:
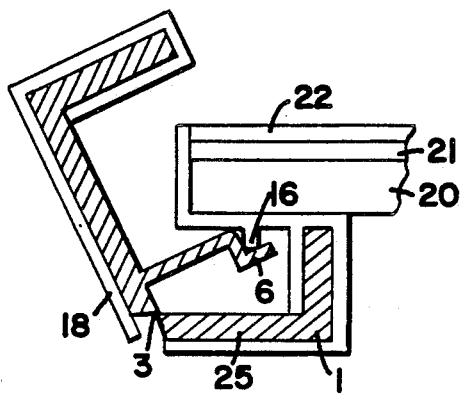
FIG. 8 is a sectional view of the front frame member in an open, outward position.

FIGS. 7 and 8 illustrate the interconnection of the corner connection fitting 1 with the front frame member 18 and the base frame member 13. As shown in the sectional assembly drawing of FIG. 7, the front frame member 18 is normally subjected to the force of the plate spring as indicated by the arrow. This is the closed position of the corner connection fitting 1. However, when the front frame member 18 moves outwardly as shown by the arrow of FIG. 8, the corner hook 6 rotates about the corner hinge 3, and the protruded end part of the corner hook 6 abuts against the frame base stopper 16. When further external pressure is applied by the user so as to employ the elasticity of the corner hook 6, the dented portion 29 of the corner hook 6 abuts against the base stopper 16, and further movement of the front frame member 18 in the outward direction is prevented by means of the base stopper 16 and the base upper part 14. The position illustrated in FIG. 8 is the open position of the corner connection fitting 1. In this fixed, open position, it is extremely convenient for the user to make adjustment or replacement of the picture 21.

Figure 9:
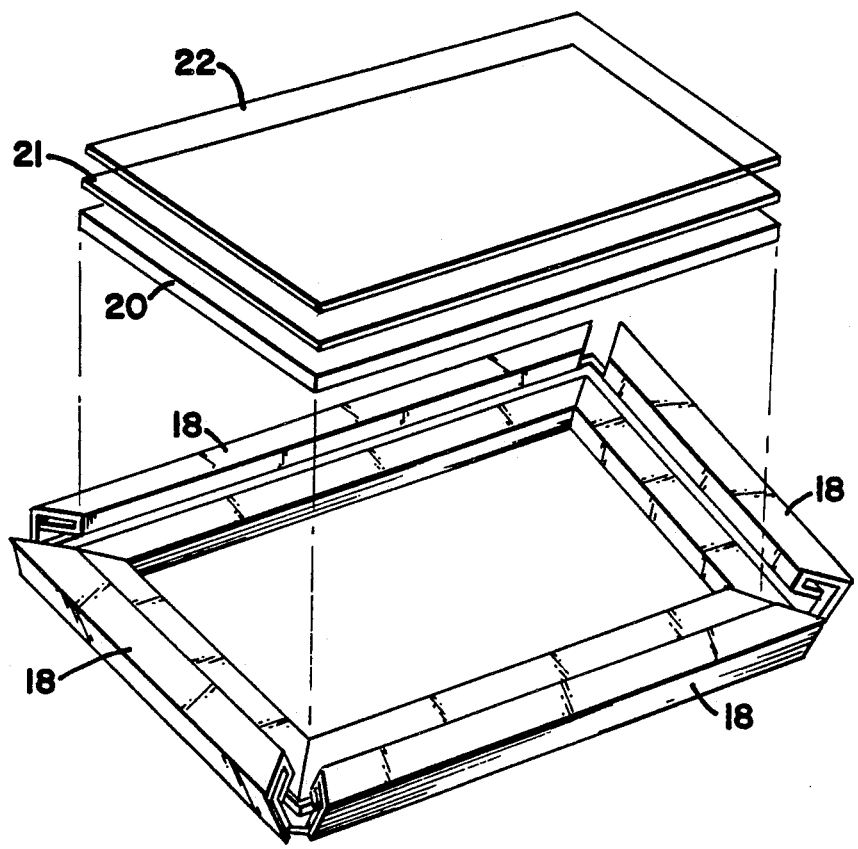
FIG. 9 is a perspective view of the front frame member in an open, outward position and installed with a basic paper picture and transparent plate.
Figure 10:
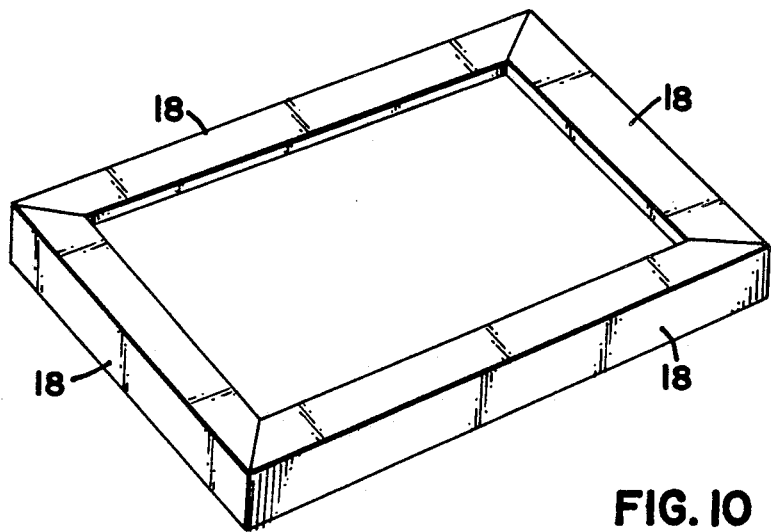
FIG. 10 is a perspective view of the front frame member in its original position after the frame has been installed with picture.

Referring to FIG. 9, when the front frame members 18 are forced to the outer, open position as shown by the arrows, the front frame members 18 are fixed in a position in which the whole face of the picture frame is expanded. As shown in FIG. 9, the picture frame may hold ground paper 20, the picture 21, and a transparent plate 22 for protection of the picture surface. When the frame is in the position shown in FIG. 9, the ground paper 20, picture 21, and transparent plate 22 are placed on the base upper part 14 at the inside of the picture face partition 17. The picture 21 can be placed and adjusted in the desired position. The edge of the picture 21 can also be placed against the base picture face partition 17. After finishing the desired adjustment or replacement of the picture 21, the front frame members 18 can be pressed toward the inside as shown by the arrows in FIG. 10. During this operation, the corner hook 6 is forced by the user around the base stopper 16, and is also forced to the inner, closed position by the biasing force of the plate spring 12. When this operation is complete, the four corners are completely adhered to make the form of the frame.

As stated above, the frame corner connection fitting 1 is utilized for forming the frame, and also enables the user to open and close the frame. When manufactured of a synthetic resin, the frame corner connection fitting can be manufactured easily. The frame assembly can be constructed by simply inserting the base frame member 13 and the front frame member 18 into the corner connection fitting 1. A primary advantage of the invention is the easy replacement of a picture 21 to be held by the frame. This is accomplished by rotating the front frame members 18 to the outer, open position. Restoration to the closed, original position of the front frames 18 is also very simple. Therefore, it is not necessary to remove the frame from the wall and disassemble it each time the picture will be replaced. Also, it is not necessary to insert the picture from the back side while constantly adjusting the position of the picture by frequently checking the front side. It should be noted that the base plate par of the base frame member 13 is a flat surface, so that this face can be used to adhere the frame easily to the wall with pressure-sensitive adhesive-coated tape. It is also possible to make holes in this part and attach string suitable hanging equipment so that the frame can hang from a wall. Therefore, the range of applications for the present invention is wide and varied. The present invention can be used not only as a picture frame, but also can be used with jigsaw puzzles, posters, or information boards. It is of particular usefulness for items which need to be replaced frequently, because of its convenience of use.

What is claimed is:

1. A corner connection fitting for a frame, the frame being of the type having a front frame member and a base frame member, said corner connection fitting comprising:

a bottom part and a side part interconnected by hinge means so that said bottom part and side part are movable between a first, closed position and a second, open position, wherein said front frame member is interconnected to said side part so that rotatable movement of said side part causes movement of said front frame member;

means for biasing said bottom part and side part toward its first, closed position, wherein said biasing means includes a plate spring;

first connection means for interconnecting said corner connection fitting to said front frame member; and second connection means for interconnecting said corner connection fitting to said base frame member.

2. The corner connection fitting according to claim 1, wherein said corner connection fitting is made of synthetic resin material.

3. A corner connection fitting for a frame, the frame being of the type having a front frame member and a base frame member, said corner connection fitting comprising:
- a bottom part and a side part interconnected by hinge means so that said bottom part and side part are rotatable with respect to each other between a first, closed position and a second, open position;
- a plate spring which biases said bottom part and said side part toward its first, closed position;
- said side part having a frame guide which is slidably interconnected to a corresponding frame guide groove formed in said front frame member, wherein rotatable movement of said side part causes movement of said front frame member; and
- said bottom part having a base guide which is slidably interconnected to a corresponding base guide groove formed in said base frame member, wherein said corner connection fitting is substantially L-shaped.

4. The corner connection fitting according to claim 3, wherein said corner connection fitting is made of synthetic resin material.

5. The corner connection fitting according to claim 3, wherein said corner connection fitting further includes a corner hook which is engagable with a base stopper on said base frame member when said corner connection fitting is in its second open position.

6. The corner connection fitting according to claim 3, wherein said corner connection fitting is L-shaped.

* * * * *